(12) United States Patent
Hedlund et al.

(10) Patent No.: US 6,934,268 B1
(45) Date of Patent: Aug. 23, 2005

(54) METHOD FOR ALLOCATING AND CONTROLLING DOWNLINK POWER IN A TELECOMMUNICATION SYSTEM

(75) Inventors: Mikael Hedlund, Luleå (SE); Staffan Johansson, Luleå (SE)

(73) Assignee: Telefonktiebolaget LM Ericsson, Stockholm (SE)

( * ) Notice: Subject to any disclaimer, the term of this patent is extended or adjusted under 35 U.S.C. 154(b) by 981 days.

(21) Appl. No.: 09/718,422

(22) Filed: Nov. 24, 2000

(30) Foreign Application Priority Data

Nov. 26, 1999 (SE) .................................. 9904299

(51) Int. Cl.[7] .......................... G08C 17/00; H04B 7/00
(52) U.S. Cl. ...................................... 370/311; 455/522
(58) Field of Search .......................... 370/311, 522, 230, 370/235; 455/522

(56) References Cited

U.S. PATENT DOCUMENTS

| | | | |
|---|---|---|---|
| 5,930,684 A | 7/1999 | Keskitalo et al. | |
| 6,144,861 A * | 11/2000 | Sundelin et al. | 455/522 |
| 6,212,174 B1 * | 4/2001 | Lomp et al. | 370/335 |
| 6,226,277 B1 * | 5/2001 | Chuah | 370/328 |
| 6,334,047 B1 * | 12/2001 | Andersson et al. | 455/69 |
| 6,553,016 B1 * | 4/2003 | Roxbergh | 370/331 |
| 6,606,341 B1 * | 8/2003 | Kanterakis et al. | 375/130 |
| 6,639,934 B1 * | 10/2003 | Engstrom et al. | 375/130 |
| 6,647,005 B1 * | 11/2003 | Cao et al. | 370/342 |
| 6,708,041 B1 * | 3/2004 | Butovitsch et al. | 455/522 |
| 6,765,897 B2 * | 7/2004 | Cordier et al. | 370/342 |

FOREIGN PATENT DOCUMENTS

| | | |
|---|---|---|
| WO | WO97/47094 | 12/1997 |
| WO | WO99/00914 | 1/1999 |
| WO | WO99/16185 | 4/1999 |

* cited by examiner

*Primary Examiner*—Massan Kizou
*Assistant Examiner*—Hong Sol Cho

(57) ABSTRACT

The present invention relates to a method in a CDMA-based communication system for power allocation and control of the downlink channels of a base station having a fixed maximum permitted downlink power level. The method includes the steps of estimating the total needed downlink power for a subsequent time interval and, if necessary, restricting the downlink power for selected subsets of user equipments by means of rejecting their requests for a downlink power increase. Admission and congestion control is done by means of analyzing and evaluating the number of rejected power requests from said user equipments.

9 Claims, 6 Drawing Sheets

METHOD FOR ALLOCATING AND CONTROLLING DOWNLINK POWER IN A TELECOMMUNICATION SYSTEM

FIELD OF THE INVENTION

The present invention relates generally to methods in telecommunication systems, more particularly to methods for downlink power allocation and control in the base station of a code division multiple access (CDMA) communication system.

BACKGROUND OF THE INVENTION

In code division multiple access (CDMA) communication systems, a plurality of base stations cover each a certain geographic area and provide communication services to users within such areas. Characteristic for CDMA-systems is that the common transmission medium is shared between different users by assigning specific and unique code sequences to the uplink and downlink channels between base station and user equipment. These code sequences are used by the transmitters to transform signals into wideband spread spectrum signals. In the receiver units, base station or user equipment, said wideband signals from a specific transmitter are retransformed into the original bandwidth by using the same code sequence as that transmitter while signals marked with different codes remain wideband signals and, thus, are interpreted by the receiver as part of the background noise.

An aspect specific to the multiple access technique used in CDMA relates to the fact that all users transmit wideband signals potentially at the same time and using the same bandwidth. Thus, one limiting factor in CDMA-based systems is a decreasing signal-to-noise ratio in the communication channels due to an increasing interference level caused by other transmitters. Said signal interference level per cell results from transmitters within said cell as well as from transmitters in the neighbouring cells. From this it becomes apparent that power control, both of uplink signals and downlink signals, is crucial in order to achieve a maximised system capacity and high quality of services. This implies for the uplink signals that the transmission power of the user equipment must be controlled, e.g., in order to avoid that users close to their serving base station dominate over users at a longer distance and in order to allow an optimised number of users within the limitations of the acceptable interference level. For the downlink signals power control is required, i.a, in order to minimise the interference to other cells and, accordingly, to compensate against interference from other cells. By this means, a base station is able to serve users preferably at any location within the cell and without a too strong contribution to the interference level of the neighbouring cells. Yet another important aspect for downlink power control relates to the fact that increasing power values lead to a spreading of the signal spectrum. Therefore, in order to avoid a spreading of the total downlink signal spectrum outside the allowed frequency range that is reserved for the downlink signals of a CDMA-based communication system, the total allocated downlink power for a base station must be limited to a maximum power level. This can be done, e.g., by means of a digital power clipping. However, it is a drawback of this solution that all users are affected equally.

As thus the downlink transmission power of a base station is a limited resource there is a need for methods to allocate appropriate power levels to the various downlink channels in such a way that the total allocated power remains below said maximum power level. One solution for said downlink power control relates to a fixed allocation of a maximum downlink power per user such that the sum of the allocated power levels remains below the maximum threshold. This minimises the risk that said maximum power level is exceeded but results in poor system capacity due to a lack of flexibility.

SUMMARY OF THE INVENTION

One object of the present invention is to provide power allocation to the downlink channels of a base station in a downlink power limited communication system.

Another object of the present invention is to provide management of the power resources for the downlink channels of a base station in a downlink power limited communication system.

In particular, it is an object of the present invention to achieve a method for downlink power limitation by means of restricting the power levels of subsets of downlink channels that have been selected according to one or more selection criterion.

It is another object of the present invention to achieve a method that is particularly useful for power control of downlink channels to those user equipments that require a real-time application service.

Still another object of the present invention relates to a method to resolve congestions due to a too high number of power restrictions for the downlink channels.

Correspondingly, still another object of the present invention relates to a method for admission of new user equipments in a downlink power limited communication system without degrading the service quality for other user equipments.

Yet another object of the present invention is a method that achieves a downlink power limited communication system which can be optimised by means of applying one or more definable criterions with regard to the supported user equipments and/or the provided service quality.

Briefly, these and other objects of the present invention are accomplished by a method that uses commands that are periodically sent to the base station from each of its user equipments and indicate a request for an increase or decrease of the transmission power of their assigned downlink channels in accordance with a short-term and a long-term total downlink power control. The short-term total downlink power control is done by means of accumulating said commands during a time period and either accepting or rejecting said power requests for all or an appropriately selected subset of user equipments. The long-term total downlink power control is done by means of admitting new user equipments or releasing a selected subset of user equipments on the basis of an evaluation of the number of rejected power requests for a certain period of time.

As a first advantage, the present invention enables a base station to control and restrict the total allocated downlink power to a permitted maximum downlink transmission power level.

It is another advantage of the present invention that said restrictions are performed only for appropriate subsets of downlink channels that can be selected according to one or more selection criterions.

Still another advantage of the present invention is that said selection criterions are definable according to the specific needs of a system operator.

It is yet another advantage of the present invention that downlink power control is possible particularly for user equipments that require a real-time application service.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

DETAILED DESCRIPTION

Figure 1:
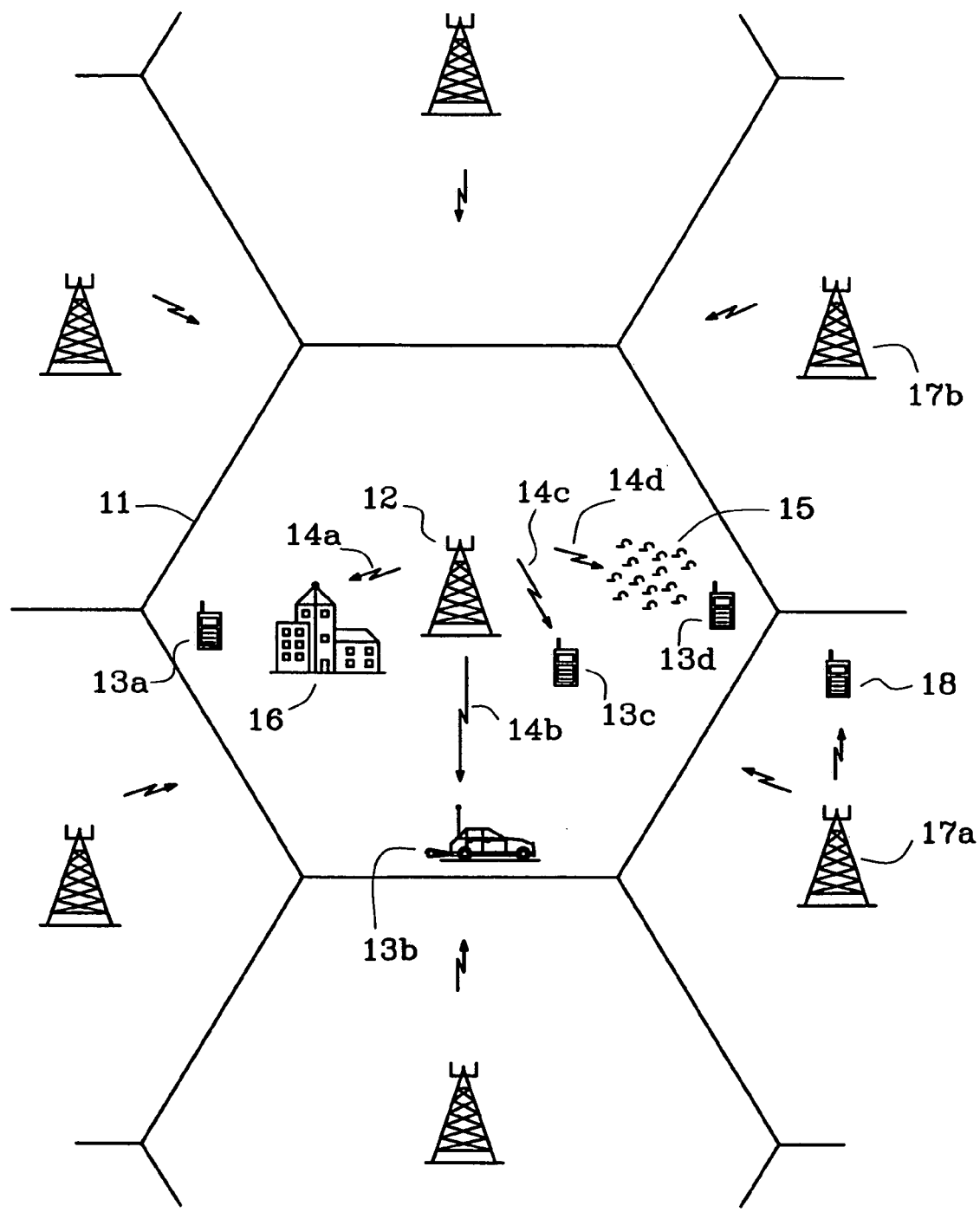
FIG. 1 shows an overview of a CDMA-based communication system within which the method according to the present invention can be applied.

FIG. 1 shows an overview of a CDMA-based radio communication system divided into a plurality of cells, each of which equipped with a base station 12 for providing communication services to and from user equipments 13a–13d within the coverage area of the base station 12. Said user equipments 13a–13d can be described according to different aspects whereby the transmission power that must be assigned to their uplink and downlink channels depend at least partly on these aspects. These aspects relate, e.g., to environmental parameters that must be taken into consideration with respect to the radio propagation conditions, e.g., general terrain characteristics and different kinds of obstacles, e.g. trees 15 or buildings 16, that influence the radio channel. Due to an increased mobility of certain users 13b said environmental parameters can change rapidly such that the transmission power must be adjusted accordingly fast. Other impacts result from the total signal interference level due to environmental noise or transmissions from other users within the cell. In addition, especially at the cell borders, a user equipment 13d may also be influenced by signal interference from, e.g., base stations 17a, 17b or users 18 in neighbouring cells while the quality of the downlink channel from the serving base station may decrease.

Yet another aspect relates to the type of communication service that the user equipments request for. Said services can be subdivided into two classes: One class of services supports best-effort applications for various kinds of data communication, e.g., electronic mail or an Internet connection. For those services no critical demands are raised with respect to the delivery time and, thus, the transmission bit rate of a connection for such a service. Another class of services is intended to support real-time applications, i.e. services that are sensitive to time delays, e.g. speech connections or data communication connections, e.g. video.

The present invention relates to a method in a downlink power limited system for power assignment to the downlink channels to user equipments that need and request for various amounts of transmission power depending on inter alia said aspects.

Figure 2A:
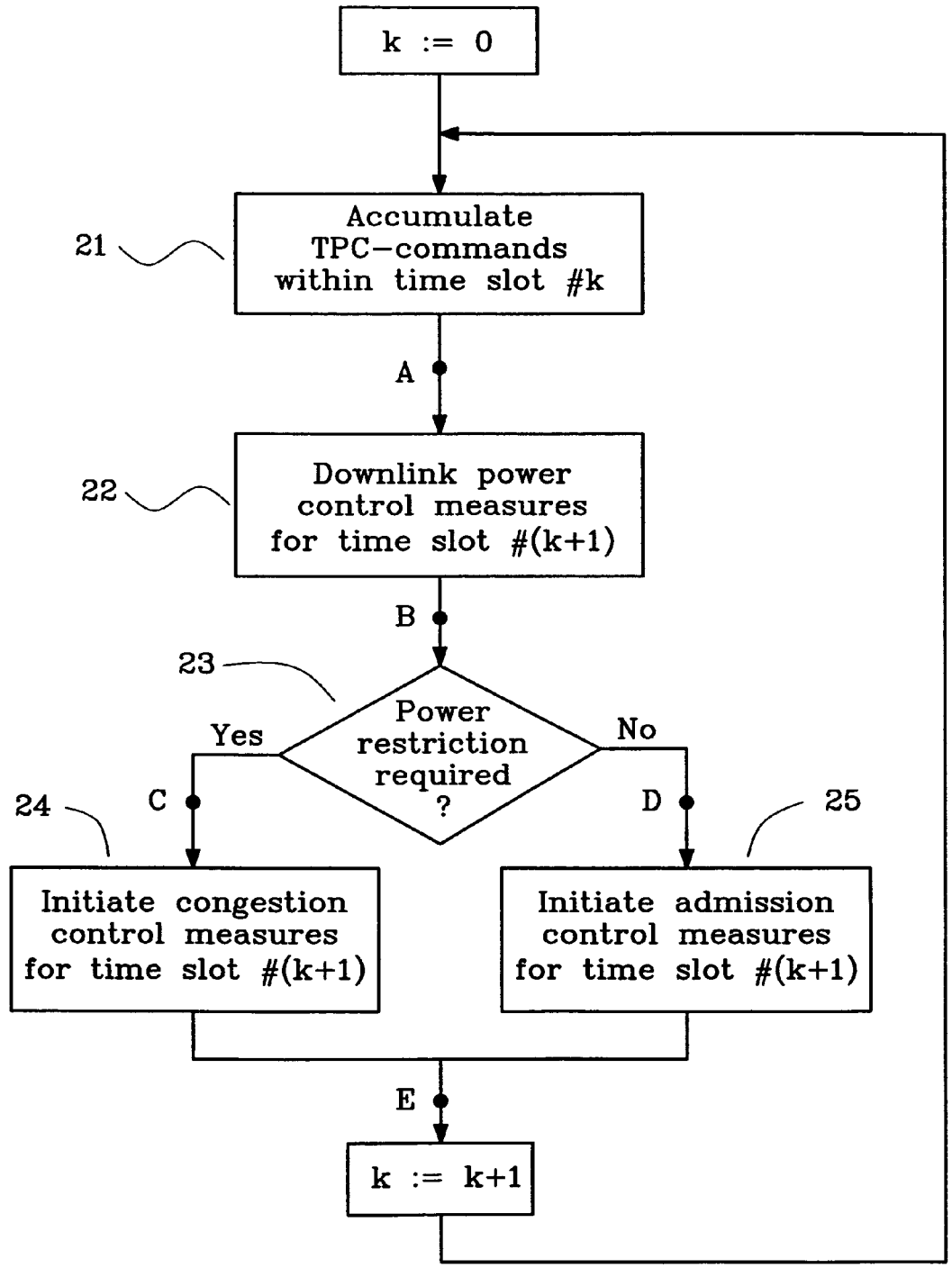
FIG. 2a shows the main steps of the method according to the present invention.
Figure 2B:
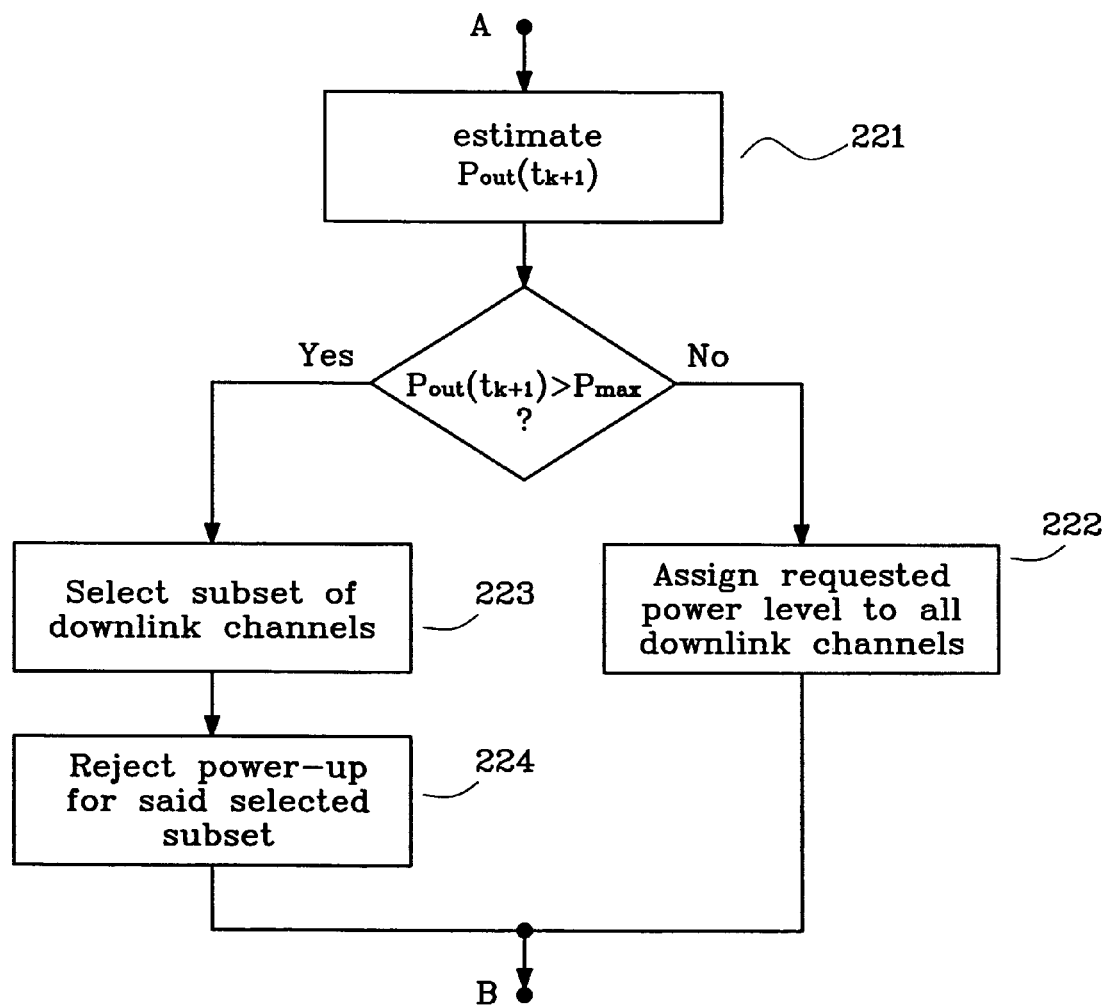
FIG. 2b refers to the downlink power control measures according to the present invention.
Figure 2C:
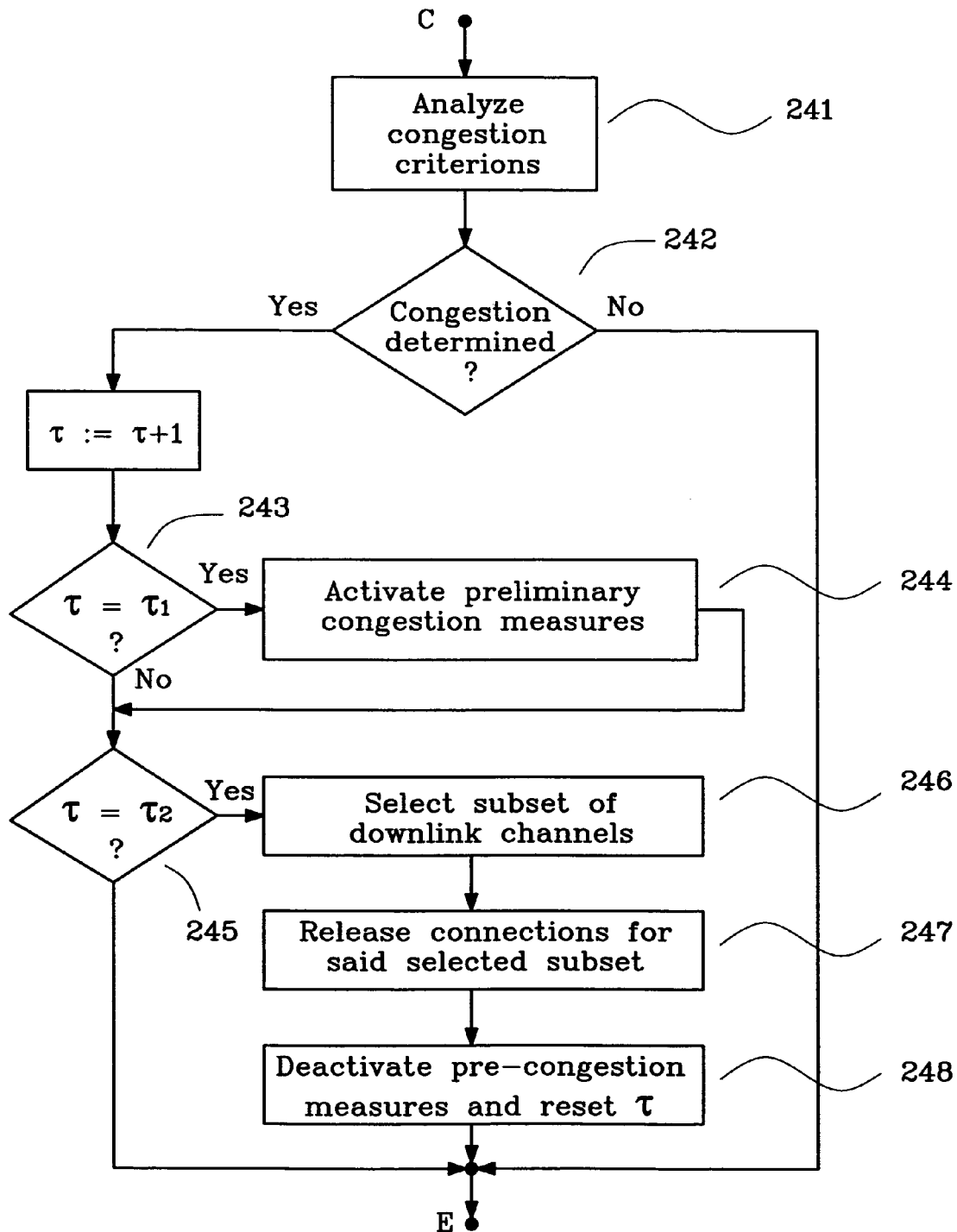
FIG. 2c refers to the congestion control measures according to the present invention.

FIGS. 2a–2d show a flowchart representing the various steps corresponding to the method according to the present invention. FIG. 2a shows an overall description of the main steps of said method while FIG. 2b refers in particular to measures for control and eventual restriction of the total allocated downlink power of a base station. FIG. 2c refers in particular to measures for congestion control for the total traffic of all user equipments that have an assigned downlink channel from a base station and FIG. 2d refers to measures for admission control for new user equipments that intend to connect to the base station. According to the present invention said method is performed centrally at the base station by means of analysing and evaluating the decentrally generated power request commands from the user equipments that have an established communication connection to said base station.

The present invention refers to a method in a CDMA-based communication system within which the bidirectional communication between user equipments and base station is performed separately by means of dedicated channels (DCH) for uplink and downlink of each of said user equipments. Regarding the uplink path there are two types of channels defined: The uplink dedicated physical data channel (DPDCH), which carries the layer-2 dedicated data, and the uplink dedicated physical control channel (DPCCH), which carries uplink layer-1 control information. Transmission on said dedicated channels is subdivided into radio frames each of them having a given length and each of them including a number of time slots. Said control information from each of the user equipments to the base station is transmitted once per time slot and includes, i.a., a command indicating a request for a stepwise increase or decrease of the downlink transmission power. In the following this command is referred to as the Transmit Power Control (TPC-) command for the downlink channel. These TPC-commands for the downlink channels are sent from the user equipments because the downlink power need mainly depend on conditions that are not known to the base station, e.g. the position within the cell but also the geographical environment. However, within the scope of the present invention, it is sufficient to presume that the user equipments send within periodical time intervals a command to the base station, said commands indicating a request for an increase or decrease of the allocated power for the downlink channel to that user equipment. These time intervals are in the following referred to as time slots.

FIG. 2a illustrates the steps of the method according to the present invention, e.g. for an arbitrary radio frame including a number of time slots that start at periodical points of time $t_k$. Here, said method is performed within each of the time slots, e.g., at those common points of time $t_{k+1}$ when all TPC-commands have been received for that time slot k from the various user equipments that have an assigned downlink channel from the base station. Thus, in a first step, block 21, all TPC-commands that have been received during time slot k, i.e. within the time interval $[t_k, t_{k+1}]$, are accumulated. In a next step, block 22, these commands are used to estimate the required total downlink power for the subsequent time slot (k+1) and, possibly, to restrict the total downlink power to the maximum permitted downlink power level $P_{max}$. Next, block 23, the effect of the downlink power control must be analysed and evaluated. If the total allocated downlink power of the base station must be limited for said subsequent time slot (k+1), congestion control measures are initiated, block 24. This may result in a decision about whether the present number of user equipments in the cell must be decreased. However, if the downlink power of the base station is presently not limited, admission control measures are initiated, block 25. This may result in a decision that the base station can accept at least one additional user equipment.

FIG. 2b illustrates for a time slot k the various steps of the method according to the invention to control the total allocated downlink power of a base station for a subsequent time slot (k+1). This corresponds to block 22 in FIG. 2a. First, block 221, the new downlink power level $P_{out}(t_{k+1})$ for said time slot (k+1) is estimated on basis of the present power level and the received and accumulated TPC-commands during the time slot k. Each TPC-command that is sent from a particular user equipment indicates a request for an increase or decrease of the power for its dedicated downlink channel by one step. Typical values for the absolute value of the step size $S_t$ are between 0, 5 dB and 1 dB, which implies that the transmission power of said downlink channel is increased or decreased by a certain step size factor $K=10^{0,1-s,}$ relative to the previously allocated downlink power $P_i$ for a downlink channel number i. Thus, the total number of TPC-commands may possibly result in an increase or decrease of the total allocated downlink power in the subsequent time slot (k+1). Accordingly, said estimated total allocated downlink power $P_{out}(t_{k+1})$ can be expressed as $$P_{out}(t_{k+1}) = \sum_{i=1}^{M} K^{\delta_i} \cdot P_i; \delta_i \in \{-1, +1\}.$$

As long as the estimated total allocated downlink power $P_{out}(t_{k+1})$ remains below the maximum permitted downlink power $P_{max}$, block 222, each user equipment can be assigned the requested power level and, thus, the downlink power for each of the user equipments is adjusted in accordance with the request indicated by the TPC-command that has been sent from that user equipment. However, if said estimated total allocated downlink power $P_{out}(t_{k+1})$ exceeds the maximum permitted downlink power level $P_{max}$, measures must be taken in order to achieve a total downlink power level below said maximum level $P_{max}$. This is done by means of selecting a subset of channels from amongst those user equipments that request for an increased downlink power level, block 223, and rejecting the TPC-commands for said selected subset of user equipments, block 224.

A subset of user equipments for which the request according to the TPC-command is rejected can be selected in several ways by applying one or a sequence of appropriate operator-defined selection criterions. In a straight-forward approach, a subset of user equipments is retrieved by randomly selecting a sufficiently high number of downlink channels to those user equipments that require an increase of their assigned downlink power. Alternatively, the subset is retrieved by cyclically selecting a subset of downlink channels to those user equipments. By this means, within certain time periods each of said downlink channels must accept a momentarily decreased quality of service due to a denied request for an increased power level. From the base stations point of view, this selection method is easy to implement and to maintain and the method is fair inasmuch as all users are affected equally. However, said selection methods only focus on the number of users and neglects other criterions that may have an influence on the total allocated downlink power. Therefore, by means of example the following describes some possible selection criterions that are applied in the preferred embodiment of the method according to the present invention. These criterions are used in order to restrict the total allocated downlink power of a base station and, subsequently, for congestion and admission control. The method according to the present invention, however, is not limited to said examples but can also be applied for other types of selection criterions.

A first possible selection criterion relates to the service that is applied by a user equipment. When comparing, e.g., two services that require considerable different transmission bit rates and, consequently, require for their downlink channels considerable different amounts of downlink power, it becomes apparent that, depending on their service, a different number of users is necessary in order to achieve a certain decrease of the total allocated downlink power below a given threshold. Services can be subdivided, e.g., into real-time applications or best-effort applications, or explicitly according to their kind, e.g. transmissions for video, voice, or packet data. Then, a possible selection method is to select, randomly or cyclically, either downlink channels from certain preferred subdivisions or to select a predefined share of downlink channels from all kinds of subdivisions.

Another selection criterion relates to the quality of the downlink channels to the various user equipments. Said downlink channel quality can be retrieved by means of the signal-to-interference ratio $E_b/I_0$. A ratio that is beneath a certain acceptable level may indicate a user equipment at a too far distance to the base station or within an unfavourable geographical environment. Consequently, those user equipments are likely to send TPC-commands that indicate a request for an increase of the downlink power for their dedicated channel. However, as an insufficient signal-to-interference ratio also can arise from a too high interference level due to a too high number of user equipments, said ratio for a specific downlink channel must be interpreted in proportion to the signal-to-interference ratio of downlink channels to other user equipments. Accordingly, primarily those users are selected for a downlink power restriction that momentarily have a too high downlink power consumption, e.g. due to an insufficient downlink channel quality, and probably cannot considerably improve the quality of their dedicated downlink channel by means of an increased downlink power as indicated by the TPC-command. Thus, it is possible by means of said selection criterion to reduce the total allocated downlink power while at the same time preserving an optimised number of user equipments with an acceptable downlink channel quality within the coverage area of the base station.

Yet another selection criterion relates to a prioritisation that can be introduced between the various user equipments such that a selection is done by means of an operator-defined priority in the user profile. Said profile may apart from ordinary users distinguish, e.g., between a prime subscription type user and a low-budget type user. In case of a necessary restriction of the total allocated downlink power, those users may be affected in the first place, or at least to a larger extent, that have a low-budget subscription type. A prioritisation can also be defined, e.g., for emergency calls.

Still another selection criterion relates to the fact that a user equipment may have established channels to different base stations, e.g. by means of a soft handover. In these cases, a reject for a power increase for the downlink channel to such a user will not decrease the service quality as long as that user has a better downlink channel from another base station.

Figure 3:
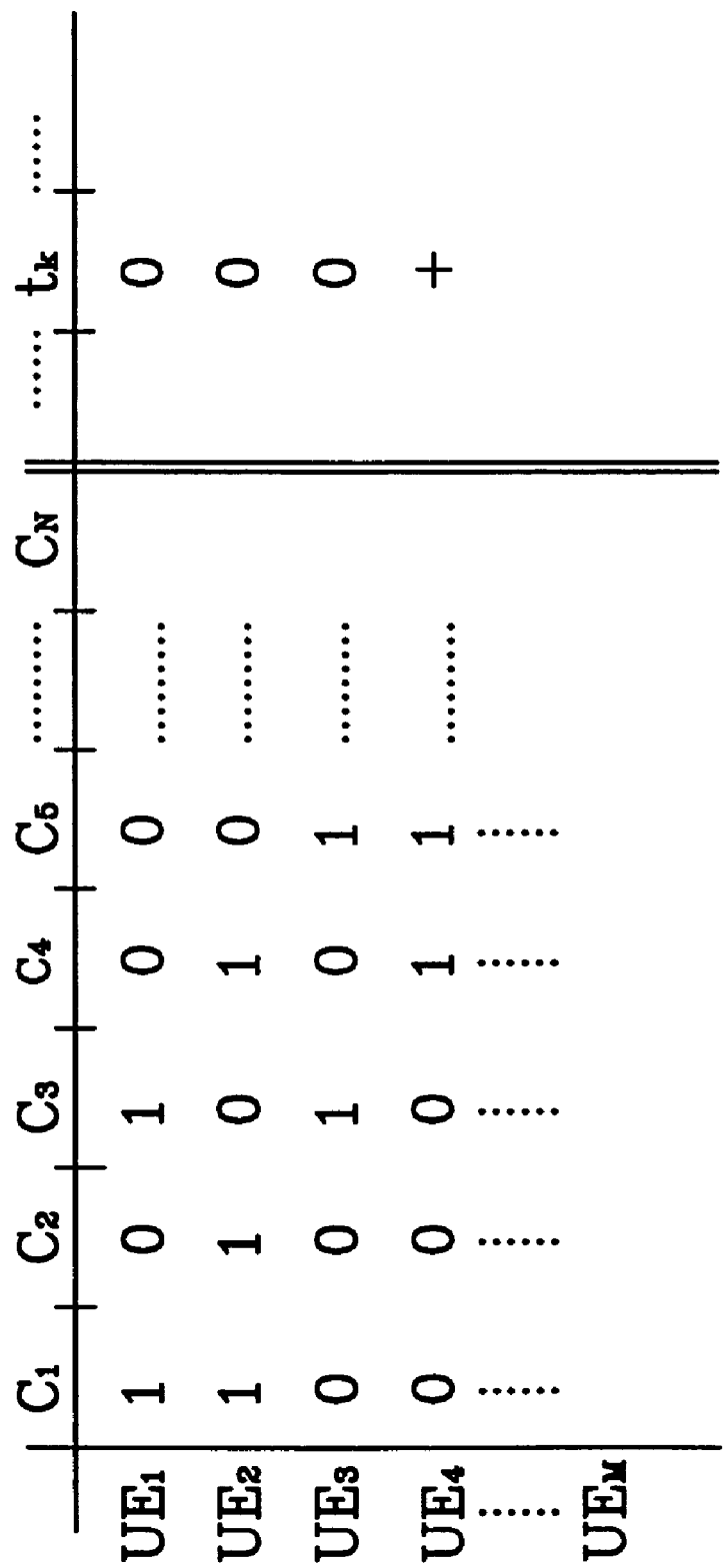
FIG. 3 shows in an example a number of user equipments each of which described by one or more characteristics.

FIG. 3 describes by means of an example how said selection criterions can be applied in order to restrict the total allocated downlink power or to resolve a congestion. All user equipments $\{UE_1, \ldots, UE_M\}$ are described, e.g., in a matrix of characteristics $C_j(i)$ wherein each of the rows represents a user equipment $UE_i$ ($i \in \{1, \ldots, M\}$) and each of the columns represents a selection criterions $C_j$ ($j \in \{1, \ldots, N\}$). The content of said matrix indicates whether a certain criterion $C_j(i)$ for a user equipment $UE_i$ is true, e.g. $C_j(i)=1$, or false, e.g. $C_j(i)=0$. With regard to the downlink power control, the matrix can be applied to derive an appropriate subset S of user equipments for which a downlink power increase shall be rejected. Then, with regard to the congestion control, the matrix can be applied to evaluate said rejections. Thus, it becomes apparent that choice and succession of said criterions are definable according to the specific needs of a network operator. Therefore, the network can be optimised according to a variety of aspects, e.g., the number of user equipments that have an assigned downlink channel from a base station or the quality of service that is offered to a majority of users within said coverage area.

A set S of user equipments for which a downlink power increase shall be rejected is derived by means of logically combining said criterions, or a selection thereof, in a certain order. This is done according to the needs of the operator. In the example according to FIG. 3, the following criterions are applied: Low-budget user ($C_1$), high power consumption ($C_2$), best-effort service ($C_3$), telephone service ($C_4$), and prime subscription type ($C_5$). The number of selected users is evaluated with respect to the total amount of power that corresponds to a power decrease by one power step for the selected downlink channels. In a first step, those user equipments are selected for a reject of the downlink power increase that fulfil the first selection criterion $C_1$. If this number is too high, said number can be reduced by means of selecting those user equipments that fulfil several criterions. This reduction is continued until an appropriate number of user equipments has been selected. Thus, by means of applying the criterions $C_1$ and $C_2$, the selected subset $S=\{UE_2\}$ contains only one user equipment for a restriction of the downlink power. Likewise, if the number of selected user equipments is too low, said number can be increased by means of selecting those user equipments that fulfil at least one of several criterions. Thus, by means of applying the criterions $C_1$ or $C_3$, the subset $S=\{UE_1, UE_2, UE_3\}$ is selected for a restriction of the downlink power. Alternatively, if the number of selected user equipments is too high, an appropriate subset can be retrieved by means of randomly or cyclically selecting from these selected user equipments. The selected user equipments are marked in a timetable containing status entries for each user equipment and for each time interval. For the above mentioned example, $UE_1$, $UE_2$, and $UE_3$ are marked with 0 indicating that their requests for a downlink power increase have been denied. For other user equipments, e.g. $UE_4$, the TPC-command can be indicated. This timetable is then used as a basis for congestion and admission control measures.

In order to reduce the requirements on data storage and computing capacity for maintaining said timetable, a sufficient statistic analyse can be performed by means of retrieving an average value for the number of rejected TPC-commands when regarding a number of time intervals:

$$\overline{N}_0(t_k) = \alpha \overline{N}_0(t_{k-1}) + (1-\alpha) N_0(t_k)$$

Here, the average number of rejected TPC-commands $\overline{N}_0(t_k)$ as calculated for the time slot interval $[t_k, t_{k+1}]$ is expressed by means of a weighted term representing the previous estimation value of said estimated number from the preceding time interval and a term $N_0(t_k)$ representing the number of rejected TPC-commands within the actual time interval $[t_k, t_{k+1}]$.

By means of the downlink power control as described above, it is assured that the total allocated downlink power of the base station remains below the maximum permitted downlink power $P_{max}$. However, in a next step the consequences of the downlink power control must be analysed. A restriction of the total allocated downlink power can possibly depend on a congestion in the network that is to be resolved. Here, a congestion implies that the total allocated downlink power $P_{out}$ is not sufficient to maintain all allocated downlink channels at an acceptable level. On the other hand, a system that presently is not downlink power limited may indicate that additional users can be admitted to enter the system.

FIG. 2c refers to congestion control measures according to the method of the present invention. This corresponds to block 24 in FIG. 2a. Said measures are applied in order to determine and resolve a congestion for user equipments to which the base station has allocated a downlink channel. A congestion is determined by means of analysing a number of congestion criterions, block 241, for those user equipments for which an increase of the allocated downlink power has been rejected. Said congestion criterions apply the selection criterions as described above and define upper threshold values for the number of user equipments within said subset that fulfil such a criterion. A congestion for the momentary time slot is determined, block 242, if one or certain congestion criterions are fulfilled. In the example according to FIG. 3, one possible congestion control criterion might be, e.g., to determine that none of the user equipments in the selected subset S must fulfil the criterion $C_5$, i.e. a prime subscription type user. In the example, this criterion is violated because the selected user equipment $UE_3$ is a prime subscription type user. Thus, in this example a congestion is determined for the present time slot.

If congestions have been determined for a sufficiently large succession of time slots, the method according to the present invention provides appropriate measures to resolve these congestions. The number of subsequent congestions may be observed, e.g., by means of a congestion time slot counter $\tau$. If said counter exceeds a first threshold value $\tau_1$, block 243, the method according to the preferred embodiment of the invention initiates preliminary congestion control measures, block 244. If said counter exceeds a second threshold value $\tau_2 (\tau_2 > \tau_1)$, block 245, appropriate control measures are initiated in order to resolve the congestion. As an alternative, which is not explicitly shown in the figure, instead of defining $\tau$ as the number of successive time slots having a congestion, $\tau$ can also be defined as the number of time slots within a certain period of time.

The preliminary congestion control measures, block 244, prepare the base station to resolve a congestion. By means of defining the threshold value $\tau_1$, which indicates the number of time slots having determined congestions, it is avoided that transient congestions force the system without cause to allocate resources for a congestion resolution. Examples for preliminary congestion control measures are to keep track on each of the various user equipments, e.g. by means of storing the received TPC-commands rejections for a downlink power increase, gathering radio channel parameters, or by means of contacting neighbouring base stations in order to get information about their system load and if some of the user equipments of the base station also have an established connection to a neighbouring base station.

If the number of congestions exceeds the second threshold value $\tau_2$, appropriate measures to resolve the congestion must be initiated. This is done, e.g., by means of applying the selection criterions as described above, selecting a number of user equipments, block 246, and releasing the connection to the base station for these selected user equipments, block 247. In a preferred embodiment, those user equipments are selected that in addition have an established connection to another base station. However, other selection criterions are applicable as well. Finally, when a congestion situation has been resolved, the preliminary congestion measures are deactivated, block 248. The congestion counter is reset to a starting value if a congestion has been resolved or if the number of congestions did not exceed the threshold value $\tau_2$.

Figure 2D:
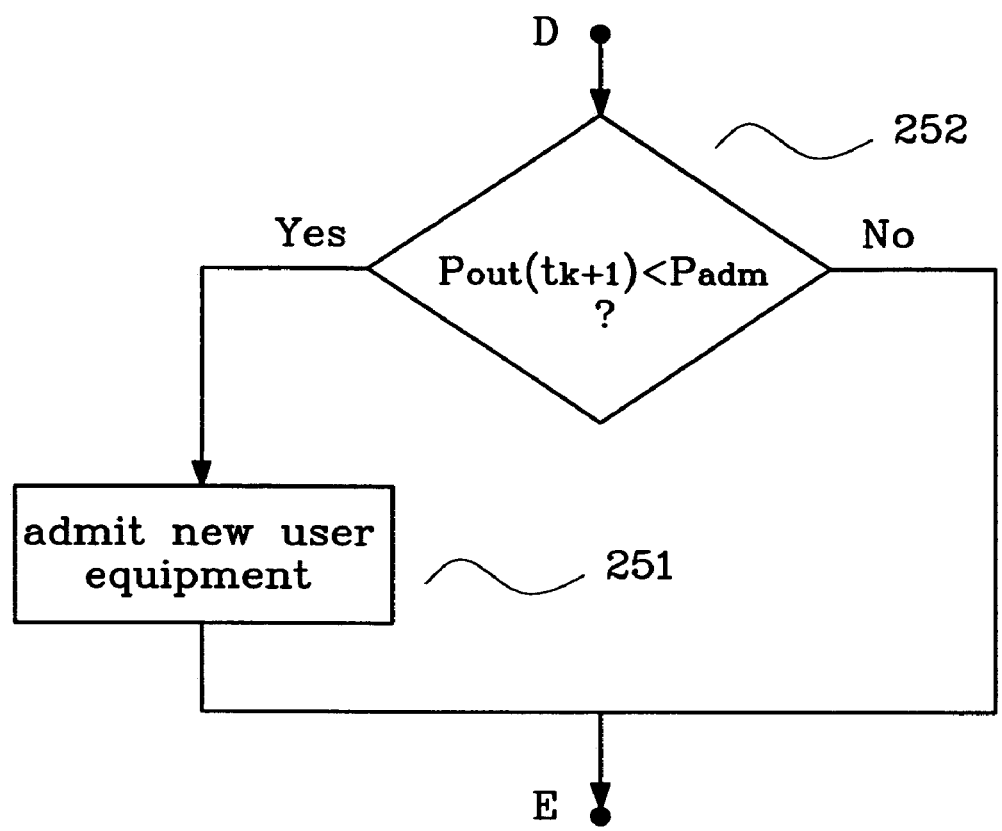
FIG. 2d refers to the admission control measures according to the present invention.

FIG. 2*d* refers to admission control measures according to the method of the present invention. This corresponds to block 25 in FIG. 2*a*. If the base station at present is not downlink power limited, this may indicate that the base station is capable to serve additional user equipments. However, this acceptance must be considered carefully in order to avoid that a new user equipment immediately causes a congestion. Thus, for an admission of a user equipment, block 251, it is required that the base station is not downlink power limited at least for the present time interval or, alternatively, for a certain number of preceding time intervals. Additionally, it is required that the total allocated downlink power for the present time interval is below a certain admission threshold level $P_{adm}$, block 252, which is defined with a certain margin below the maximum permitted downlink power level. Said margin should be selected sufficiently large such that it can hold at least one additional user equipment. Thus, it becomes apparent that the size of the margin is operator-definable depending on the amount of power that the operator is willing to assign as a minimum to a new user equipment. Further, said margin can be adjusted, e.g., with respect to the system performance.

What is claimed is:

1. Method of allocating and controlling downlink power in a telecommunication system including a plurality of base stations, each of which providing communication services by means of downlink channels requiring certain portions of allocated downlink power and a plurality of user equipments, each of which occupying a downlink channel of at least one base station for usage of said communication services, and each of which sending within common periodical time intervals power requests to said base station in order to adjust the transmission power of its occupied downlink channel, performing for each base station within said time intervals the steps of:

accumulating said received power requests for each of the occupied downlink channels;

estimating the total allocated downlink power level for the base station with regard to the received power requests for each of the occupied downlink channels;

accepting said received power requests for all downlink channels and initiating admission control measures if said estimated downlink power level is below a maximum permitted downlink power level; and rejecting said received power requests for a selected subset of downlink channels and initiating congestion control measures if said estimated downlink power level exceeds a maximum permitted downlink power level.

2. Method according to claim 1, wherein said congestion control measures including the steps of;

applying the number of rejected power requests for the present and/or a number of preceding time intervals in one or a combination of operator-definable congestion criterions;

determining a congestion for the present time interval if one or more congestion criterions are fulfilled; and if the number of subsequently determined congestions or the number of congestions within several time intervals exceeds a given threshold value $\tau_2$ including the additional steps of;

selecting a subset of downlink channels to a number of user equipments; and resolving the congestion by releasing the downlink channels of said selected subset.

3. Method according to claim 2, in comprising the steps of initiating preliminary congestion measures if the number of subsequent congestions or the number of congestions within a given time interval exceeds a first threshold value $\tau_1 < \tau_2$.

4. Method according to claim 1, wherein said admission control measures including the steps of accepting a new user equipment for the base station if the estimated downlink power level is below an operator-definable admission power level.

5. The method according to claim 1, comprising the step of selecting a sunset of downlink channels to a number of user equipments by applying one or a combination of operator-definable selection criterions.

6. Method according to claim 5, comprising the step of applying the type of service that is requested from a user equipment as a selection and/or congestion criterion.

7. Method according to claim 5, comprising the step of applying the signal-to-interference ratio of the downlink channels as a selection and/or congestion criterion.

8. Method according to claim 5, comprising the step of applying an operator-definable priority of a user equipment as a selection and/or congestion criterion.

9. Method according to claim 5, comprising the step of applying the number of downlink channels that are assigned to a user equipment from different base stations as a selection criterion.

* * * * *